(12) United States Patent
Anderson, IV et al.

(10) Patent No.: US 7,152,118 B2
(45) Date of Patent: Dec. 19, 2006

(54) SYSTEM, METHOD AND COMPUTER PROGRAM PRODUCT FOR CACHING DOMAIN NAME SYSTEM INFORMATION ON A NETWORK GATEWAY

(75) Inventors: Charles Edward Anderson, IV, Woodstock, GA (US); Thomas Carroll Willis, Jr., Westminster, CO (US); Jason Andrew Willis, Westminister, CO (US)

(73) Assignee: Broadcom Corporation, Irvine, CA (US)

( * ) Notice: Subject to any disclaimer, the term of this patent is extended or adjusted under 35 U.S.C. 154(b) by 612 days.

(21) Appl. No.: 10/080,676

(22) Filed: Feb. 25, 2002

(65) Prior Publication Data

US 2003/0172183 A1    Sep. 11, 2003

(51) Int. Cl.
*G06F 15/16* (2006.01)
(52) U.S. Cl. ...................... 709/245; 709/225
(58) Field of Classification Search ................ 709/245, 709/203, 202, 225
See application file for complete search history.

(56) References Cited

U.S. PATENT DOCUMENTS

| | | | |
|---|---|---|---|
| 6,016,512 A * | 1/2000 | Huitema | 709/245 |
| 6,256,671 B1 * | 7/2001 | Strentzsch et al. | 709/227 |
| 6,262,987 B1 * | 7/2001 | Mogul | 370/400 |
| 6,532,490 B1 * | 3/2003 | Lewis et al. | 709/217 |
| 6,976,090 B1 * | 12/2005 | Ben-Shaul et al. | 709/246 |
| 2002/0031102 A1 * | 3/2002 | Wiedeman et al. | 370/316 |
| 2002/0103783 A1 * | 8/2002 | Muhlestein | 707/1 |
| 2003/0012147 A1 * | 1/2003 | Buckman et al. | 370/260 |
| 2004/0073707 A1 * | 4/2004 | Dillon | 709/245 |

FOREIGN PATENT DOCUMENTS

WO    WO 00/27092    5/2000

OTHER PUBLICATIONS

WO 00/27092; "DNS Relay Module in a Digital Network Modem"; Eicon Technology Corporation; May 11, 2000.*
Mockapetris, P.; "Domain Names—Implementation and Specification"; RFC 1035; Nov. 1987.*
Kasser, Barbara; "Practical Internet"; 2000; Que; pp. 40-43.*
Perry, Greg M.; "Sams Teach Yourself PCs in 24 Hours"; 1999; Sams Publishing; pp. 72 and 431.*
Copy of European Search Report, dated Aug. 24, 2004, issued in EP application No. 03004067.9, 5 pages.
Cohen et al. "Prefetching The Means For Document Transfer: A New Approach For Reducing Web Latency",IEEE INFOCOM 2000, Proceedings of the Nineteenth Annual Joint Conference of the IEEE Computer and Communications Societies, Tel Aviv, Israel, Mar. 26-30, 2000, pp. 854-863.

(Continued)

*Primary Examiner*—William Vaughn
*Assistant Examiner*—Joseph Maniwang
(74) *Attorney, Agent, or Firm*—Sterne, Kessler, Goldstein & Fox P.L.L.C.

(57) ABSTRACT

A system, method and computer program product is provided for caching domain name system (DNS) information on a network gateway. In particular, a network gateway that interfaces one or more customer premises equipment (CPE) devices to an IP network maintains a centralized on-board cache for storing domain names and corresponding IP addresses. The domain names and IP addresses in the cache are used by the network gateway to resolve DNS queries generated by application programs running on the CPE devices in a manner that is transparent to the CPE devices and that does not expend CPE resources. The cache may be initially loaded by an attached CPE or an external network entity and is continuously populated with information extracted from DNS messages exchanged between a CPE device and the external IP network.

31 Claims, 10 Drawing Sheets

OTHER PUBLICATIONS

Cohen et al., "Proactive Caching Of DNS Records: Addressing A Performance Bottleneck", *Applications and the Internet, 2001 Proceedings*, San Diego, CA, Jan. 8-12, 2001, pp. 85-94.

CableHome 1.0 Network Management and Provisioning Specification (CH-SP-NMP-W01-101201), Cable Television Laboratories, Inc., Oct. 12, 2001, 125 pages.

* cited by examiner

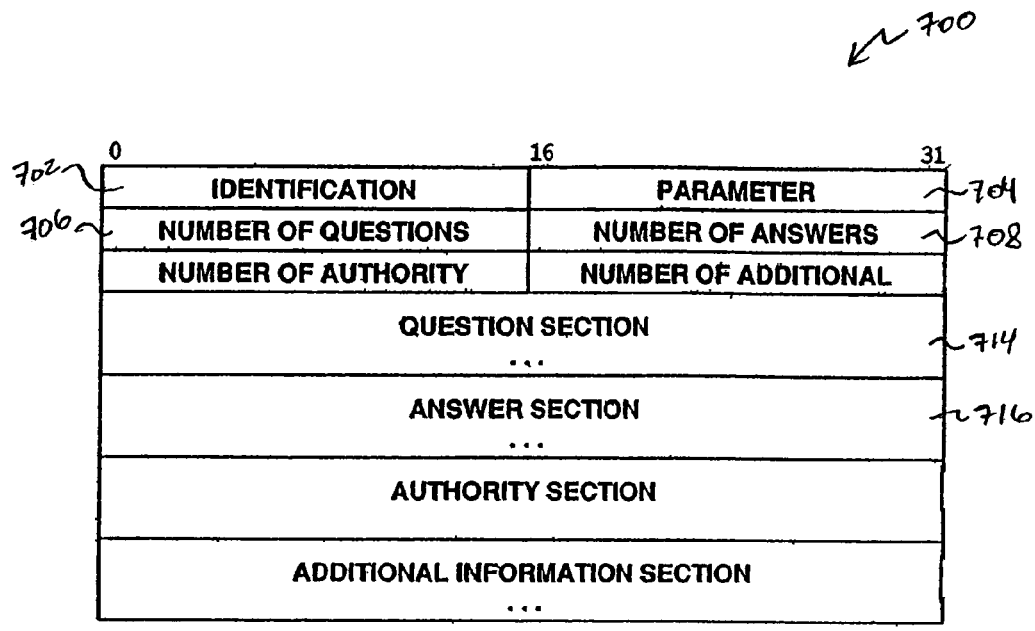

FIG. 7A

| Bit of PARAMETER field | Meaning |
|---|---|
| 0 | Operation:<br>  0 Query<br>  1 Response |
| 1-4 | Query Type:<br>  0 Standard<br>  1 Inverse<br>  2 Completion 1 (now obsolete)<br>  3 Completion 2 (now obsolete) |
| 5 | Set if answer authoritative |
| 6 | Set if message truncated |
| 7 | Set if recursion desired |
| 8 | Set if recursion available |
| 9-11 | Reserved |
| 12-15 | Response Type:<br>  0 No error<br>  1 Format error in query<br>  2 Server failure<br>  3 Name does not exist |

FIG. 7B

SYSTEM, METHOD AND COMPUTER PROGRAM PRODUCT FOR CACHING DOMAIN NAME SYSTEM INFORMATION ON A NETWORK GATEWAY

CROSS-REFERENCE TO RELATED APPLICATIONS

This application is related to co-pending utility application entitled "System and Method for Selectively Caching Domain Name System Information on a Network Gateway," application Ser. No. 10/080,671, filed concurrently herewith and incorporated by reference herein in its entirety.

BACKGROUND OF THE INVENTION

1. Field of the Invention

The present invention is generally related to data networks. More specifically, the present invention is related to a system and method for temporarily storing digital information in one or more components of a data network, such as a network gateway.

2. Background

An Internet Protocol (IP) address comprises a compact numeric identifier for a computer or other device residing on a TCP/IP network. Conventional TCP/IP applications utilize IP addresses to assign a source and destination to packets for routing across a network. IP addresses are typically formatted as 32-bit numeric addresses that are written as four numbers, each of which can be between 0 and 255, separated by periods. For example, 140.252.1.54 may constitute a valid IP address. N-bit IP addresses of other lengths may be utilized as well.

However, to achieve an improved human interface to networks, users prefer to assign network devices pronounceable, easily remembered names. To this end, the Domain Name System (DNS) provides a hierarchical naming scheme for assigning high-level domain names to devices on a TCP/IP network. A typical domain name consists of a sequence of sub-names separated by a period, which serves as a delimiter character. Each individual section of the domain name is termed a label, and any suffix of a label in a domain name may be referred to as a domain. Domain names are typically written with the local label first and the top domain last (e.g., uspto.gov).

DNS also provides a distributed database system and protocol that is used by TCP/IP applications to map between high-level domain names and IP addresses. The database system is distributed in the sense that no single machine on a network holds all the mapping information. Rather, each site (e.g., university department, campus, company, or department within a company) maintains its own database of domain names and corresponding IP addresses and runs a server program that permits other devices on the network to query the database. The server program is typically referred to as a domain name server. Often, where the server program is executed on a dedicated processor, the machine itself is called the domain name server. The process by which a TCP/IP application utilizes one or more domain name servers to map a domain name to an IP address may be referred to as domain name resolution.

Because no single network machine holds all DNS mapping information, an application program executing a DNS lookup may experience lag while waiting for resolution of a domain name. To better understand this concept, an exemplary domain name resolution process will now be described in reference to a conventional network configuration 100 depicted in FIG. 1. As shown in FIG. 1, a customer premises equipment (CPE) 102 is interfaced to an IP network 106 via a network gateway device 104. The CPE 102 may comprise a personal computer, data terminal equipment, or other user device capable of executing applications that send and receive packets over the IP network 106 via the network gateway 104. As used herein, the term "network gateway" refers to any device that interfaces one or more CPE devices to a network, including but not limited to an IP network. The IP network 106 facilitates the routing of packets between the network gateway 104 and other network entities, such as a DHCP server 108, a plurality of domain name servers 110a through 110n, and a host machine 112.

The CPE 102 is assigned a primary domain name server from the plurality of domain name servers 110a through 110n. The primary domain name server is the domain name server that CPE 102 will access in the event that it needs to resolve an IP address. The primary domain name server may be assigned to the CPE 102 in a variety of ways. For example, the primary domain name server may be dynamically assigned during an exchange of Dynamic Host Configuration Protocol (DHCP) messages that occurs between the CPE 102 and the DHCP server 108 when the CPE first accesses the network 106 to receive its initial IP address assignment. The CPE 102 may also be assigned additional domain name servers that may be accessed in the event that the primary domain name server is unavailable or, in some modes of operation, when a DNS look-up to the primary domain name server fails.

In the present example, an application program running on CPE 102 is presented with a domain name for the host machine 112 for the purpose of transmitting IP packets to and/or from the host machine 112. In response, the application program invokes a software routine, sometimes called a resolver, to ascertain the IP address that corresponds to the domain name. Once invoked, the resolver generates a DNS query to the primary domain name server assigned to the CPE 102. If the DNS database in the primary domain name server contains the IP address associated with the domain name, then the primary domain name server will send a DNS response to the CPE 102 including that information.

However, if the primary domain name server does not have access to the necessary information, several additional network transactions must occur, the nature of which will depend on whether the DNS look-up is being performed in accordance with a recursive resolution protocol or an iterative resolution protocol.

If recursive resolution is being utilized, the primary domain name server will forward the DNS query to one or more alternate domain name servers via the IP network 106 to resolve the domain name. These alternate domain name servers may, in turn, generate requests to further domain name servers to resolve the query. If the domain name cannot be resolved after a predetermined number of queries, a message will be sent to the CPE 102 indicating that the DNS lookup has failed. Alternately, if the domain name is resolved, then a DNS response will be sent to the CPE 102 providing the necessary IP address information. This propagation of DNS queries between domain name servers will have the undesired effects of generating latency for TCP/IP applications running on CPE 102 and wasting bandwidth within the IP network 106.

Alternately, in accordance with an iterative resolution protocol, if the primary domain name server cannot provide the necessary mapping information, a failure message is sent to the CPE 102, which then sends a new query to additional assigned domain name servers (e.g., a secondary domain name server, a tertiary domain name server, and so on) until such time as the name is resolved or until a predetermined query limit is reached. As a result, an iterative resolution protocol also has the undesired effects of generating latency and wasting network bandwidth.

To alleviate the latency and reduced bandwidth that results from performing domain name resolution, some conventional domain name servers employ a cache of recently resolved domain names and IP addresses as well as a record of where the mapping information was obtained. When a client device queries the domain name server to resolve a name, the domain name server first determines if the name resides in the server database. If not, the domain name server examines its cache to see if the name has been recently resolved. If the required information resides in the cache, the domain name server will report the cached information to the client device along with an identification of the server from which the mapping was obtained. The client may then either use the IP address provided by the domain name server or query the server from which the mapping was originally obtained to determine that the mapping between domain name and IP address is still valid.

While the above-described caching mechanism may improve the latency and bandwidth reduction associated with some DNS look-ups, it suffers from disadvantages. For example, because the cache resides on the domain name server, it must store name and address mappings for numerous client devices. However, because server resources are finite, only a subset of the DNS mappings handled by the domain name server may be stored in the cache at any given point in time. As a result, the cached information may not always be relevant to every client on the network. In particular, where a network is very busy, a CPE on the network that transmits a DNS query may experience a high likelihood of a cache miss.

Additionally, the caching mechanism described above is selective only in the sense that it will store DNS information corresponding to the most recently queried domain names. However, this is generally not the most efficient caching algorithm for a particular CPE residing on the network or for a particular application program being executed by a network client. Furthermore, the above-described mechanism still requires, at a minimum, an exchange of messages between a client and a domain name server over the network which, by necessity, will result in some lag and reduction in bandwidth.

What is needed, then, is a system and method for performing domain name resolution that avoids the latency and reduced bandwidth associated with conventional DNS look-ups. The desired system and method should utilize domain name caching in a manner that is customized to the needs of a particular CPE or application program to reduce cache misses. Furthermore, the desired system and method should perform caching in a manner that is transparent to the CPE and does not require an access to the IP network for every instance of domain name resolution.

BRIEF SUMMARY OF THE INVENTION

The present invention provides a system, method and computer program product for caching domain name system (DNS) information on a network gateway. In embodiments, the network gateway includes a customer premises equipment (CPE) interface, a network interface, a cache for storing domain names and corresponding IP addresses, and a processor coupled to the CPE interface, the network interface, and the cache. In embodiments, a DNS query is received from a CPE over the CPE interface. The DNS query includes an unresolved domain name. The processor determines if the unresolved domain name is stored in the cache. If the unresolved domain name is stored in the cache, the processor obtains an IP address corresponding to the unresolved domain name from the cache, generates a response to the query that includes the IP address corresponding to the unresolved domain name, and provides the response to the CPE interface for transmission to the CPE. If the unresolved domain name is not stored in the cache, the processor provides the query to the network interface for transmission to a network for resolution of the query.

In further embodiments, the network interface receives a DNS response from the network. The response includes a response domain name and an IP address corresponding to the response domain name. The processor stores the response domain name and the IP address corresponding to the response domain name in the cache. The processor also provides the response to the CPE interface for transmission to the CPE.

The invention is advantageous in that it provides a centralized DNS cache for resolving DNS queries generated by one or more CPE devices attached to a network gateway in a manner that is transparent to the CPE devices and that does not expend CPE resources.

The invention is also advantageous in that it permits caching of DNS information that is most relevant to one or more CPE devices attached to a network gateway.

The invention is further advantageous in that it permits the resolution of DNS queries without requiring access to an IP network.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 7A illustrates an example format for DNS messages generated in accordance with embodiments of the present invention.

FIG. 7B is a table that defines the bits of the parameter field of the example DNS message format of FIG. 7A.

Figure 1:
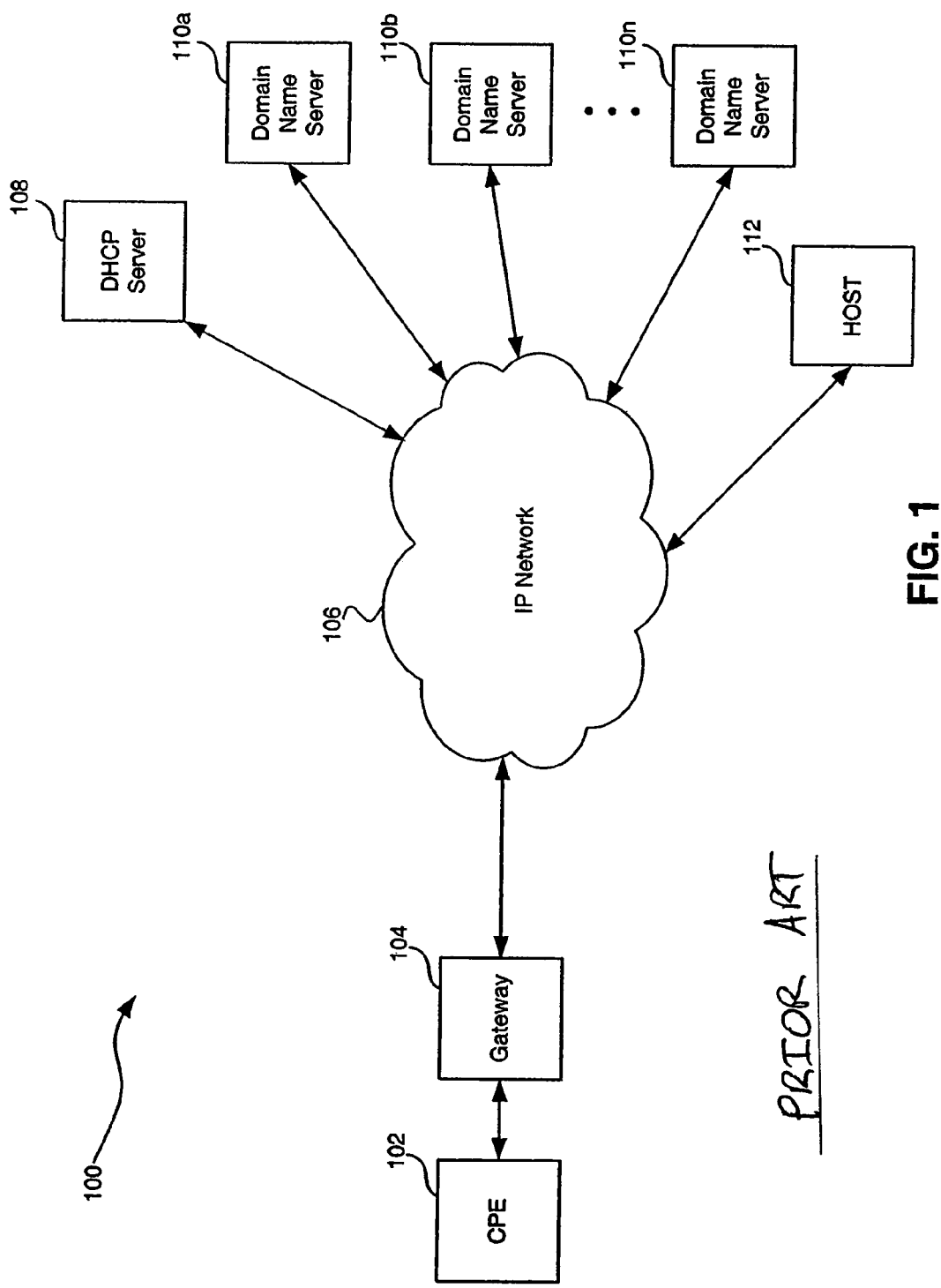
FIG. 1 is a depiction of a conventional network configuration that supports domain name resolution in accordance with the Domain Name System (DNS).

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

A. Introduction
B. Exemplary Operating Environment
　1. Example CPE in Accordance with Embodiments of the Present Invention
　2. Example Network Gateway in Accordance with Embodiments of the Present Invention
C. DNS Caching on a Network Gateway in Accordance with Embodiments of the Present Invention
D. Selective DNS Caching on a Network Gateway Based on CPE Input in Accordance with Embodiments of the Present Invention
E. Conclusion A. Introduction The present invention utilize a system, method and computer program product for caching Domain Name System (DNS) information on a network gateway. In an embodiment, a network gateway maintains a centralized DNS cache that stores domain names and corresponding IP addresses. The network gateway utilizes the DNS cache to resolve DNS queries generated by application programs running on one or more attached CPE devices. In particular, the network gateway intercepts DNS queries directed from the one or more CPE devices to a network and resolves them using information from the DNS cache in a manner that is transparent to the CPE devices and that does not expend CPE resources. The DNS cache may be pre-loaded by an attached CPE device or external network entity and/or populated with information extracted from DNS messages exchanged between a CPE device and the external IP network. In an embodiment, the DNS cache is selectively loaded based on a list of frequently accessed domain names generated by an application program running on an attached CPE and provided to the gateway.

B. Exemplary Operating Environment

Figure 2:
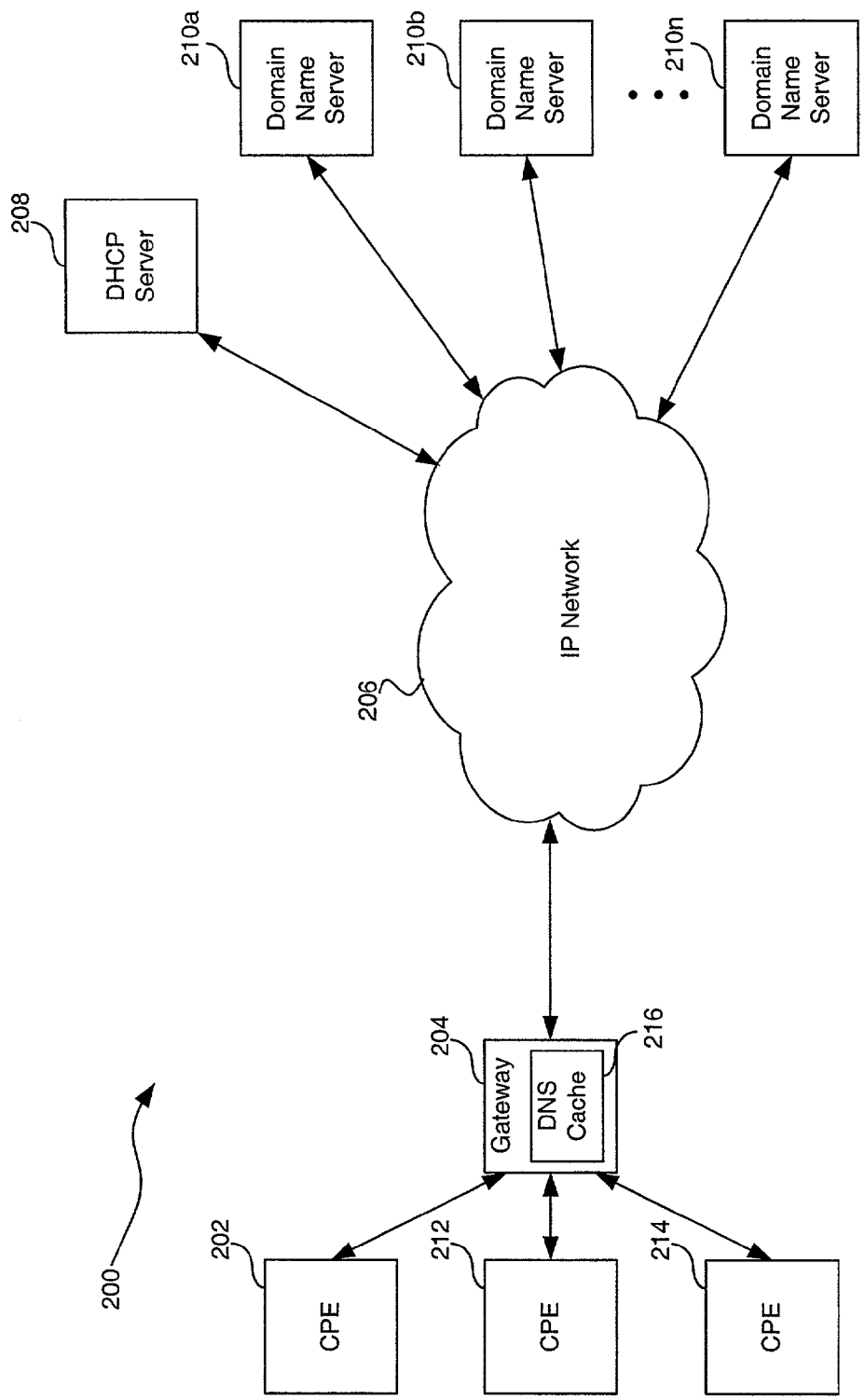
FIG. 2 illustrates an example environment in which embodiments of the present invention may operate.

FIG. 2 depicts an exemplary environment 200 in which embodiments of the present invention may operate. The example operating environment 200 includes a plurality of customer premises equipment (CPE) devices 202, 212 and 214 interfaced to an IP network 206 via a network gateway 204. In this example, three CPE devices are shown connected to the network gateway 204; however, any number of customer devices may be attached. For example, in alternate example environments, only a single CPE 202 is connected to the network gateway 204.

The representative CPE devices 202, 212, and 214 may each comprise a personal computer, data terminal equipment, or any other user device capable of executing applications that send and receive packets over the IP network 206 via the network gateway 204. The IP network 206 routes packets between the network gateway 204 and other network devices, such as a DHCP server 208 and a plurality of domain name servers 210a through 210n. In embodiments, at least a portion of the IP network 206 routes IP packets in accordance with well-known TCP/IP protocols.

The network gateway 204 comprises an interface between the CPE devices 202, 212 and 214 and the IP network 206. In part, the network gateway 204 facilitates the bi-directional transfer of IP packets between the CPE devices 202, 212 and 214 and the IP network 206 by performing essential physical and link layer conversions between CPE-side and network-side transmission protocols. In embodiments, the network gateway 204 may comprise a cable modem, analog modem, DSL modem, ISDN adapter, Ethernet card, or any other interface that facilitates the transmission of IP packets between a CPE and an IP network. In accordance with embodiments of the present invention, the network gateway 204 further comprises a DNS cache 216 for caching DNS information that is relevant to applications running on one or more of the attached CPE devices 202, 212, and 214, as will be described in more detail below.

Figure 3:
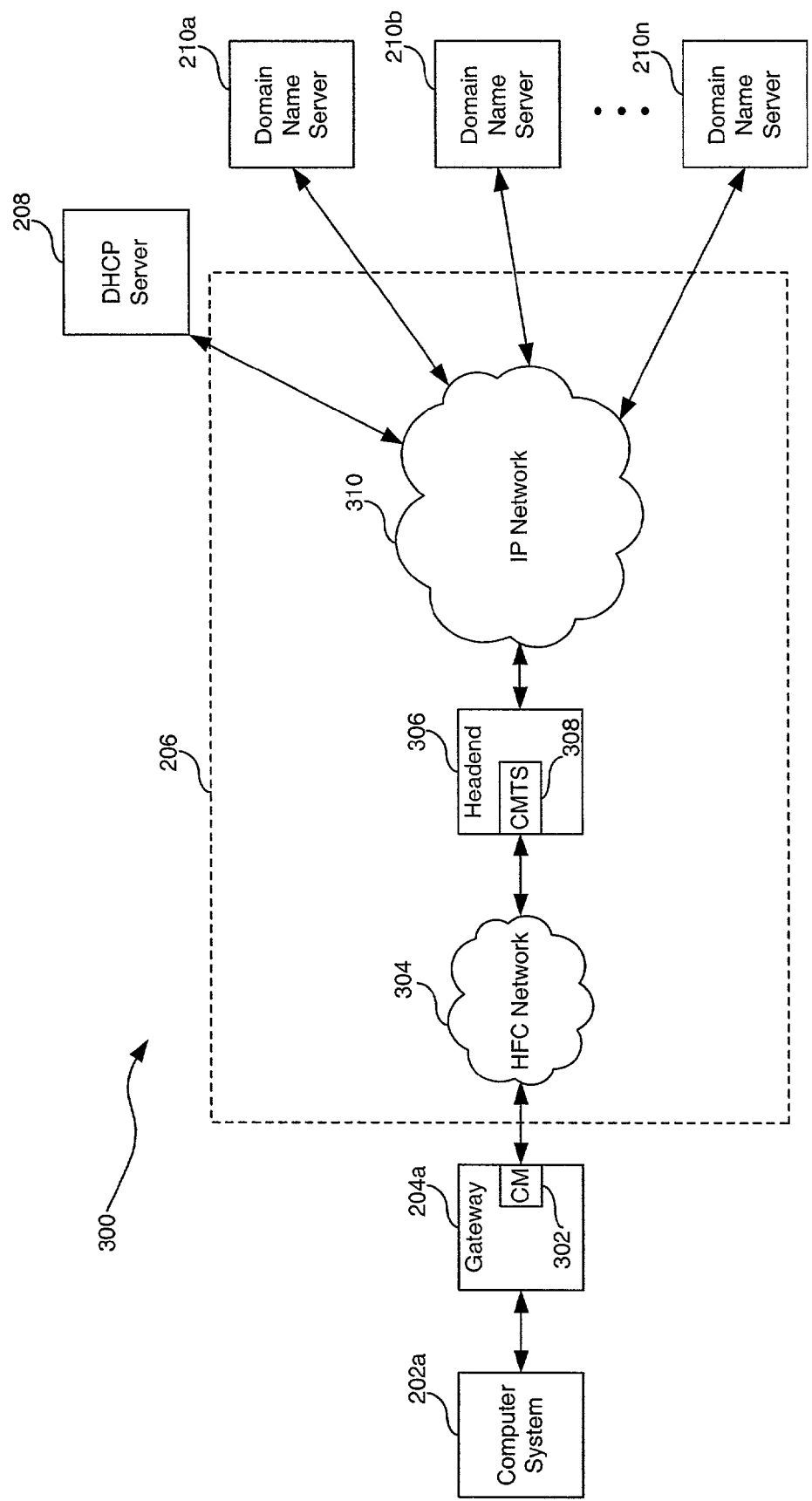
FIG. 3 illustrates an example environment in which embodiments of the present invention may operate.

FIG. 3 illustrates a more particularized example of an environment 300 in which embodiments of the present invention may operate. In the example operating environment 300, a computer system 202a, which is one embodiment of CPE 202, is interfaced to the IP network 206 through a network gateway device 204a, which is one embodiment of the network gateway 204. The network gateway device 204a includes a cable modem 302 for transferring IP packets between the computer system 202a and the IP network 206.

The IP network 206 of the example operating environment 300 includes a hybrid fiber coaxial (HFC) network 304, a cable headend 306, and a wide area network 310. The cable headend 306 includes a cable modem termination system (CMTS) 308 that receives packets sent from the cable modem 302 over the HFC network 304. The cable headend 306 operates to transfer IP packets between the HFC network 304 and the wide area network 310, thus enabling communication between the computer system 202a and other network devices, such as the DHCP server 208 and the plurality of domain name servers 210a through 210n. In an embodiment, IP packets are transferred between the cable modem 302 and the CMTS 308 in accordance with standard DOCSIS or EuroDOCSIS protocols for cable modem systems, which are well-known in the art.

1. Example CPE in Accordance with Embodiments of the Present Invention

Figure 4:
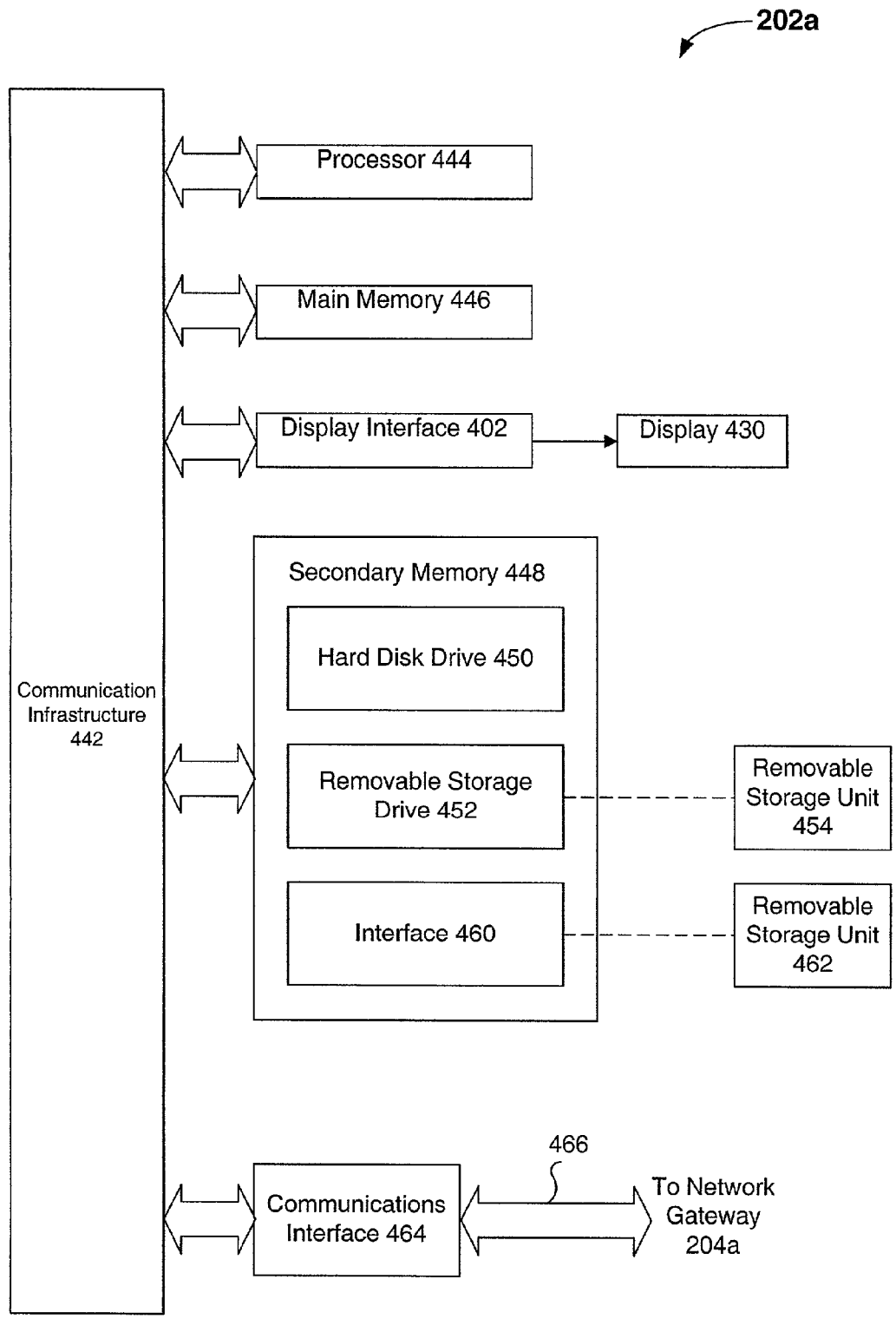
FIG. 4 depicts an example customer premises equipment (CPE) in accordance with embodiments of the present invention.

FIG. 4 provides a more detailed example of the computer system 202a, which is one example of a CPE 202. As shown in FIG. 4, the example computer system 202a includes a processor 444 for executing software routines in accordance with embodiments of the present invention. Although a single processor is shown for the sake of clarity, the computer system 202a may also comprise a multi-processor system. The processor 444 is connected to a communication infrastructure 442 for communication with other components of the computer system 202a. The communication infrastructure 442 may comprise, for example, a communications bus, cross-bar, or network.

Computer system 202a further includes a main memory 446, such as a random access memory (RAM), and a secondary memory 448. The secondary memory 448 may include, for example, a hard disk drive 450 and/or a removable storage drive 452, which may comprise a floppy disk drive, a magnetic tape drive, an optical disk drive, or the like. The removable storage drive 452 reads from and/or writes to a removable storage unit 454 in a well known manner. Removable storage unit 454 may comprise a floppy disk, magnetic tape, optical disk, or the like, which is read by and written to by removable storage drive 452. As will be appreciated by persons skilled in the art, the removable storage unit 454 includes a computer usable storage medium having stored therein computer software and/or data.

In alternative embodiments, secondary memory 448 may include other similar means for allowing computer programs or other instructions to be loaded into computer system 202a. Such means can include, for example, a removable storage unit 462 and an interface 460. Examples of a removable storage unit 462 and interface 460 include a program cartridge and cartridge interface (such as that found in video game console devices), a removable memory chip (such as an EPROM, or PROM) and associated socket, and other removable storage units 462 and interfaces 460 which allow software and data to be transferred from the removable storage unit 462 to computer system 202a.

Computer system 202a further includes a display interface 402 that forwards graphics, text, and other data from the communication infrastructure 442 or from a frame buffer (not shown) for display to a user on a display unit 430.

Computer system 202a also includes a communication interface 464. Communication interface 464 allows software and data to be transferred between computer system 202a and external devices via a communication path 466. In an embodiment of the present invention, the communication interface 464 permits IP packets to be transferred between the computer system 202a and the network gateway device 204a (see FIG. 3), which is coupled to the communication path 466. The communication interface 466 may comprise, for example, a Home Phone Network Alliance (HPNA) interface for communicating over an HPNA network, an Ethernet interface for communicating over an Ethernet, or a Universal Serial Bus (USB) interface for communicating over a USB. However, these examples are not limiting, and any communication interface 464 and any suitable 4 communication path 466 may be used to transfer data between the computer system 202a and the network gateway device 204a.

As used herein, the term "computer program product" may refer, in part, to removable storage unit 452, removable storage unit 454, a hard disk installed in hard disk drive 450, or a carrier wave carrying software over a communication path 466 (wireless link or cable) to communication interface 464. A computer useable medium can be a storape medium, including a magnetic media, optical media, or other recordable media, or a transmission media that transmits a carrier wave or other signal. These computer program products are means for providing software to computer system 202a.

Computer programs (also called computer control logic) are stored in main memory 446 and/or secondary memory 448. Computer programs can also be received via communications interface 464. Such computer programs, when executed, enable the computer system 202a to perform the features of the present invention as discussed herein. In particular, the computer programs, when executed, enable the processor 444 to perform features of the present invention. Accordingly, such computer programs represent controllers of the computer system 202a.

In embodiments of the present invention, the computer system 202a comprises a personal computer operating under the Microsoft WINDOWS operating system. However, this example is not limiting. As will be appreciated by persons skilled in the relevant art from the teachings provided herein, a wide variety of other computer systems 202a, and CPE devices 202, 212, and 214, may be utilized to practice the present invention.

Figure 5:
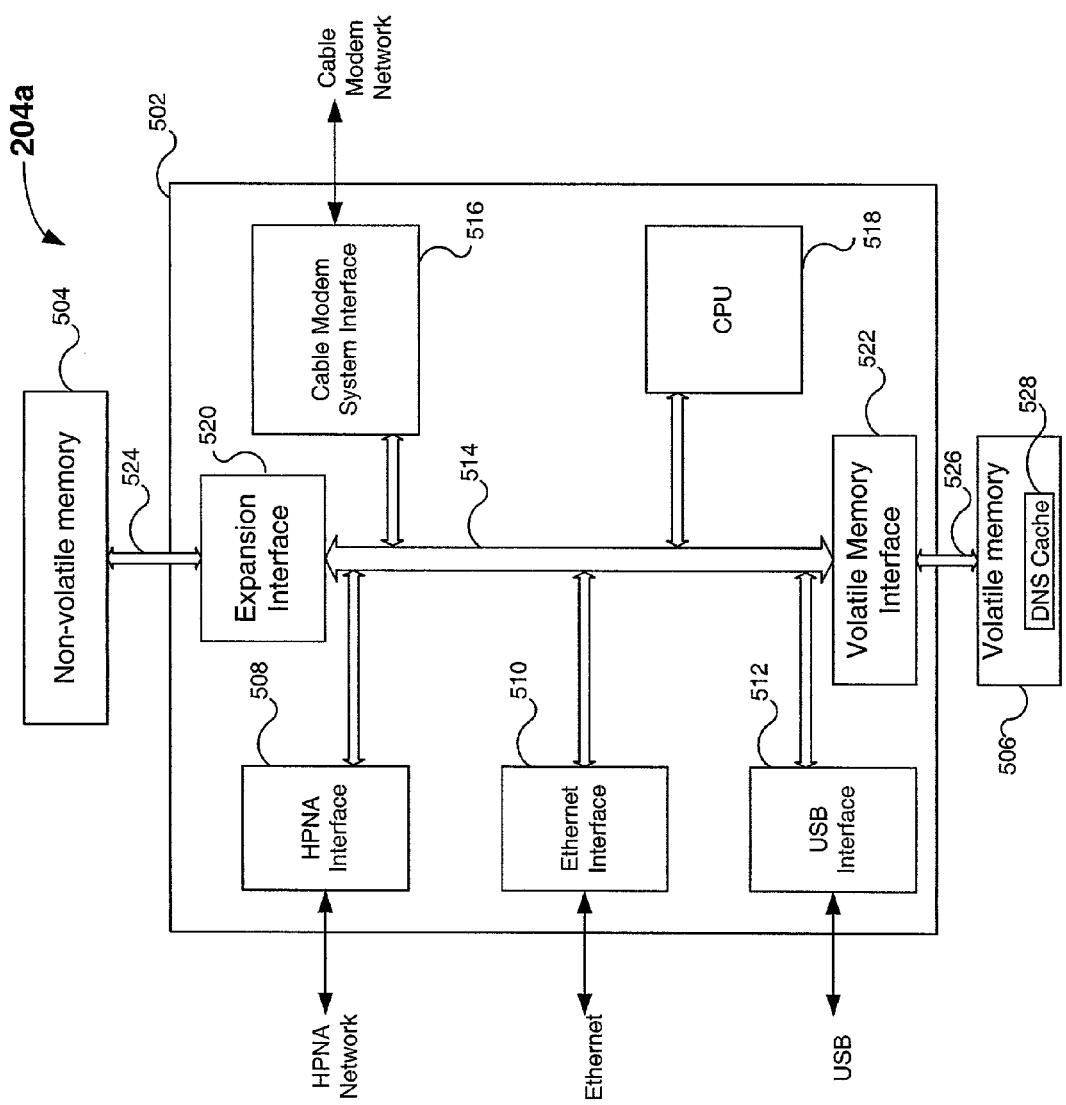
FIG. 5 depicts an example network gateway device in accordance with embodiments of the present invention.

2. Example Network Gateway in Accordance with Embodiments of the Present Invention FIG. 5 provides a more detailed example of the network gateway device 204a, which is one example of a network gateway 204. As shown in FIG. 5, the example network gateway device 204a comprises an integrated chip 502 which is coupled to two external memory devices, a non-volatile memory 504 and a volatile memory 506. The integrated chip 502 comprises a central processing unit (CPU) 518, a cable modem system interface 516, an HPNA interface 508, an Ethernet interface 510, a USB interface 512, an expansion bus interface 520, and a volatile memory interface 522. Each of these components is operatively interconnected via an internal system bus 514.

The HPNA interface 508, the Ethernet interface 510 and the USB interface 512 each provide an interface between the network gateway device 204a and one or more CPE devices over an HPNA network, an Ethernet, or a USB, respectively. For example, each of these interfaces may connect the network gateway device 204a to a CPE device such as the computer system 202a described in reference to FIGS. 3 and 4 above. In an embodiment, the HPNA interface 508 comprises an HPNA 2.0-compliant media access control (MAC) that connects to an external HPNA 2.0 analog front end (not shown) for interfacing to one or more home network devices. In an embodiment, the Ethernet interface 510 comprises a combined 802.3 Ethernet MAC and physical interface (PHY) for interfacing to one or more devices on a 10/100 Mb Ethernet. In an embodiment, the USB interface 512 comprises a USB 1.1 MAC and PHY for interfacing to the Universal Serial Bus of an attached CPE.

The cable modem system interface 516 comprises the interface between the network gateway device 204a and a cable modem network, such as the HFC network 304 of FIG. 3, to which it is connected via an external cable tuner device (not shown). In embodiments, the cable modem system interface 516 comprises a DOCSIS MAC and PHY for transmitting and receiving packets over a cable modem system in accordance with standard DOCSIS and/or Euro-DOCSIS protocols.

The network gateway device 204a operates, in part, to process packets received from one or more CPE devices via the HPNA interface 508, the Ethernet interface 510, or the USB interface 512 for transmission to a cable modem network via the cable modem system interface 516. Conversely, the network gateway device 204a processes packets received from the cable modem network via the cable modem system interface 516 for transmission to one or more CPE devices via the HPNA interface 508, the Ethernet interface 510, or the USB interface 512. Processing of packets includes necessary physical and link layer protocol conversions between the various interfaces described above as well as network address translation (NAT). Processing is carried out, in part, by the central processing unit (CPU) 518.

The volatile memory 506 stores packets for processing by the CPU 518 and also comprises the execution memory space for the CPU 518. Additionally, in accordance with embodiments of the present invention, the volatile memory 506 includes a DNS cache 528 for the temporary storage of domain names and corresponding IP addresses, as will be discussed in more detail herein. However the invention is not limited to this embodiment. For example, in an alternate embodiment, the DNS cache 528 is stored in the non-volatile memory 504.

As shown in FIG. 5, the volatile memory 506 is coupled to the internal bus 514 of the integrated chip 502 via a volatile memory interface 522 over an external bus 526. Although the volatile memory 506 is shown as an external component with respect to the integrated circuit 502, in an alternate embodiment, the volatile memory 506 may comprise an internal component of the integrated circuit 502. In an embodiment, the volatile memory 506 comprises an SDRAM.

The non-volatile memory 504 stores program instructions that control the operation of the CPU 518. In an embodiment, the non-volatile memory resides on an expansion bus 524 external to the integrated chip 502. The expansion bus 524 is operably connected to the internal bus 514 of the integrated chip 502 via an expansion bus interface 520. Although the non-volatile memory 504 is shown as an external component with respect to the integrated circuit 502, in an alternate embodiment, the non-volatile memory 504 may comprise an internal component of the integrated circuit 502. In an embodiment, the non-volatile memory 504 comprises a flash memory. The non-volatile memory 504, or a computer useable medium that carries software for installation on the non-volatile memory 504, comprises a "computer program product," as that term is used elsewhere herein.

In an embodiment, the network gateway device 204a comprises a BCM3360 High-Performance Advanced PHY Broadband Gateway Cable Modem, manufactured by Broadcom Corporation of Irvine, Calif. However, this example is not limiting. As will be appreciated by persons skilled in the relevant art from the teachings provided herein, a wide variety of network gateway devices 204a, and network gateways 204, may be utilized to implement embodiments of the present invention.

C. DNS Caching on a Network Gateway in Accordance with Embodiments of the Present Invention In accordance with embodiments of the present invention, a network gateway, such as the network gateway 204 of FIG. 2, maintains a DNS cache for the temporary storage of domain names and corresponding IP addresses. The DNS cache is utilized by the network gateway to resolve domain name queries generated by application programs running on one or more attached CPE devices, such as the CPE devices 202, 212 and 214 of FIG. 2, in a manner that is transparent to the CPE devices and that does not expend CPE resources. By maintaining a centralized DNS cache on the network gateway, embodiments of the present invention are capable of efficiently caching the DNS information that is most relevant to CPE devices attached to the network gateway 204. Furthermore, by maintaining the DNS cache on the network gateway 204, embodiments of the present invention permit domain name resolution to occur without requiring access to a domain name server over an IP network.

Figure 6:
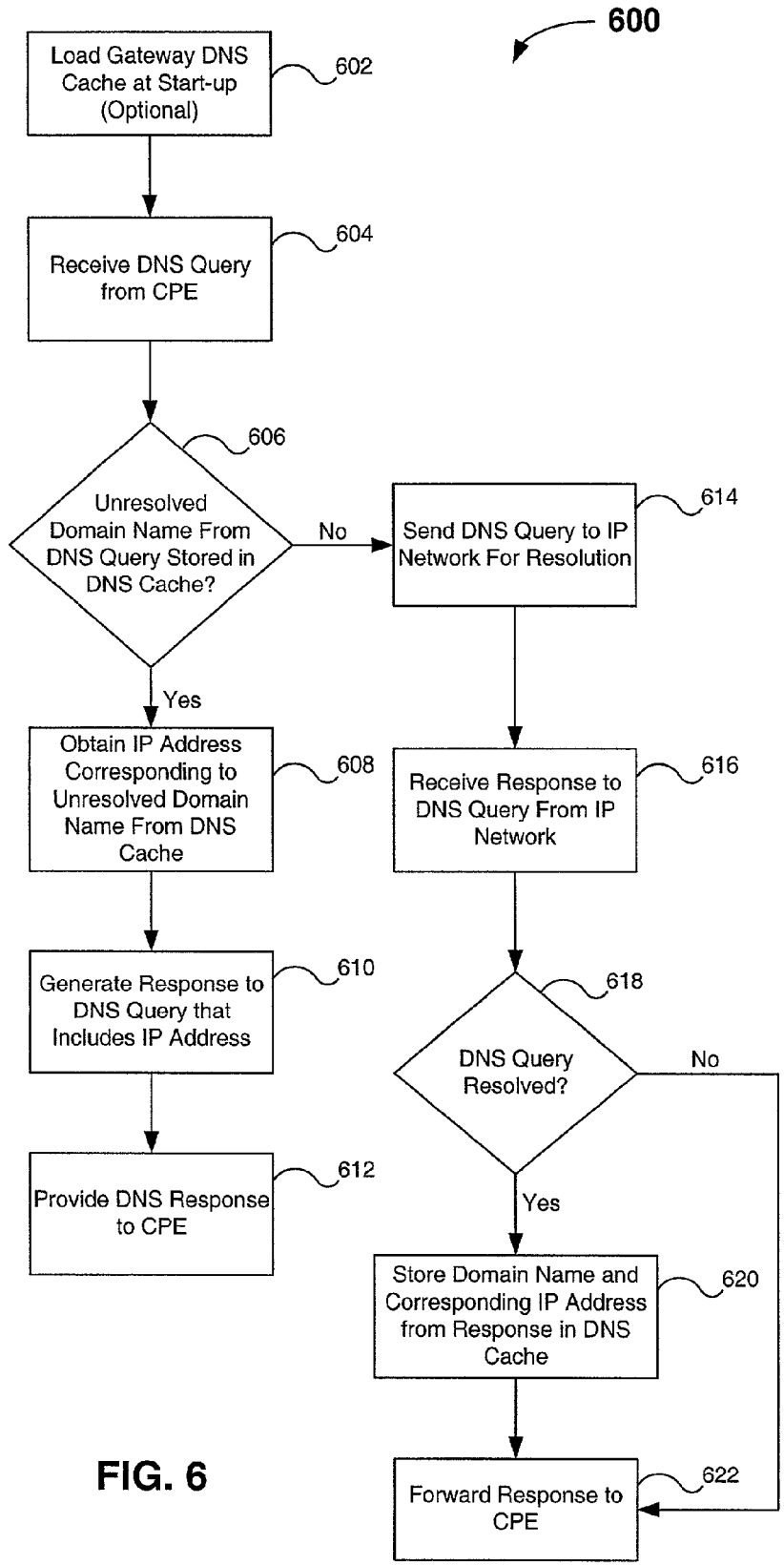
FIG. 6 depicts a flowchart of a method for caching DNS information on a network gateway in accordance with embodiments of the present invention.

FIG. 6 depicts a flowchart 600 of a method for caching DNS information on a network gateway in accordance with embodiments of the present invention. The invention, however, is not limited to the description provided by the flowchart 600. Rather, it will be apparent to persons skilled in the art from the teachings provided herein that other functional flows are within the scope and spirit of the present invention.

For convenience, the flowchart 600 will be described with continued reference to the example operating environment of FIG. 3, the example computer system 202a of FIG. 4 and the example network gateway device 204a of FIG. 5. For example, the method described in flowchart 600 may be performed, in whole or in part, under the control of the CPU 518 of the network gateway device 204a in accordance with program instructions stored in the non-volatile memory 504. However, the invention is not limited to those embodiments.

It will be assumed for the purposes of this description that the computer system 202a is executing an application, such as a TCP/IP application, that generates DNS queries. It will further be assumed that the computer system 202a has been assigned a primary domain name server from among the plurality of domain name servers 210a through 210n that reside on the IP network 206. For example, the primary domain name server may be assigned during an exchange of DHCP messages between the computer system 202a and the DHCP server 208 that occurs when the computer system 202a first accesses the IP network 206 to receive an initial IP address assignment. The DHCP server 208 may be located at an Internet Service Provider (ISP) facility that services the computer system 202a.

As shown at optional step 602, the DNS cache may initially be populated with a set of domain names and corresponding IP addresses when the network gateway device 204a first accesses the IP network 206. This optional loading step may be initiated by the network gateway device 204a itself or by a machine on the IP network 206 such as the DHCP server 208 or the CMTS 308. For example, the DHCP server 208 may initiate the loading of the DNS cache during the initial exchange of DHCP messages between the computer system 202a and the DHCP server 208 described above. Alternatively, this loading process may be initiated by the CMTS 308 during the initialization that occurs when the network gateway device 204a first accesses the HFC network 304 as proscribed by DOCSIS protocols. In an embodiment, the initial set of domain names and corresponding IP addresses resides in a file on a network-attached server for downloading to the network gateway 204a and storage in the DNS cache.

The optional pre-loading step 602 may be used to allow a network entity to selectively provision a set of domain names and corresponding IP addresses into 3 the DNS cache at start-up. This DNS information preferably represents information that will be relevant to applications running on the computer system 202a and any other CPE devices attached to the network gateway device 204a. For example, in a "walled garden" scenario, in which a network entity such as the DHCP server 208 or the CMTS 308 restricts access by the computer system 202a to certain addresses on the IP network, the DNS information downloaded at start-up may correspond to those IP addresses that the computer system 202a is permitted to access.

At step 604, a DNS query is received from the computer system 202a. In accordance with embodiments of the present invention, the network gateway 204a identifies DNS messages by continuously examining the protocol header field of IP datagrams received via a CPE interface, such as the HPNA interface 508, the Ethernet interface 510, or the USB interface 512. If the protocol header field indicates that the IP datagram contains a DNS message, then the network gateway 204*a* will examine the DNS message to determine if it comprises a DNS query.

In an embodiment, DNS messages received from the computer system 202*a* are formatted in accordance with the example DNS message format 700 of FIG. 7A. In such an embodiment, the network gateway device 204*a* determines whether the DNS message constitutes a DNS query by examining the parameter field 704 of the DNS message. As shown in FIG. 7B, which provides a key 730 to the various bit values of the parameter field 704, a "0" in the first bit of the parameter field 704 indicates that the message is a DNS query.

Figure 7C:
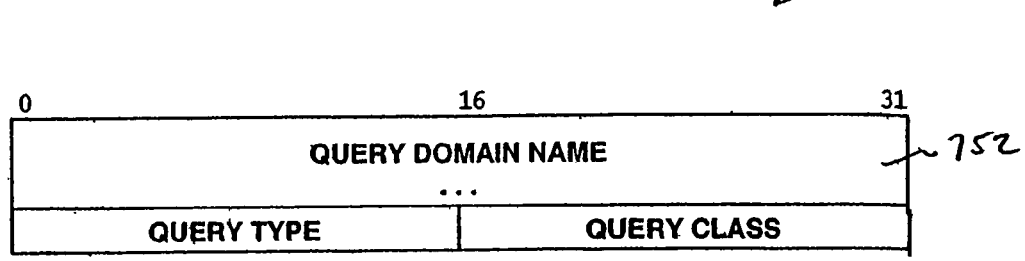
FIG. 7C depicts an example question section entry corresponding to the example DNS message format of FIG. 7A.

If the DNS message is a query, the network gateway device 204*a* obtains an unresolved domain name from the DNS query. DNS queries formatted in accordance with the DNS message format 700 may include one or more domain names for resolution purposes. The question section 714 of such queries will normally include an entry for each unresolved domain name and the "number of questions" field 706 will indicate the total number of entries in the question section 714. FIG. 7C illustrates an example format 750 for an entry in the question section 714. As shown in FIG. 7C, each entry 750 includes a query domain name 752 for which resolution is sought.

As shown at step 606, after the network gateway device 204*a* has obtained an unresolved domain name from the DNS query, it then searches the DNS cache to determine if the unresolved domain name and corresponding IP address information is available therein. If the unresolved domain name is not in the cache, or if the cache is empty (for example, at network start-up in an embodiment where the optional cache loading step 602 is not performed) then a cache miss results. However, if the unresolved domain name and associated IP address information is stored in the DNS cache, then the network gateway 204*a* will obtain the IP address information from the DNS cache, as shown at step 608, and generate a response to the DNS query that includes the IP address, as shown at step 610.

Figure 7D:
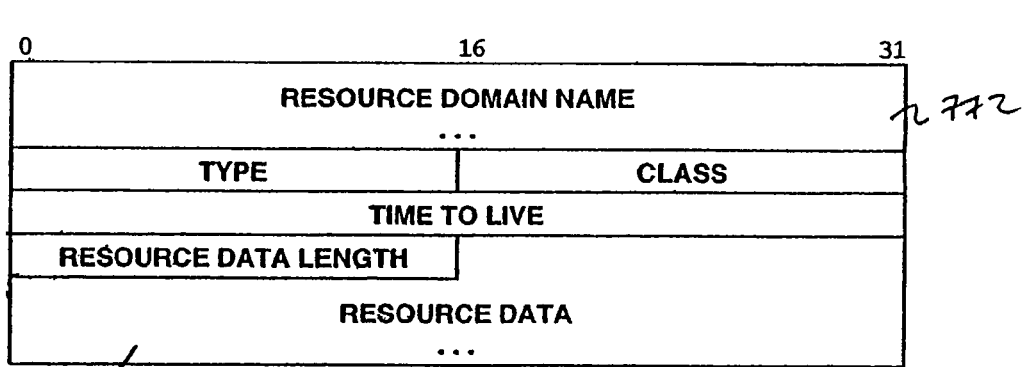
FIG. 7D depicts an example answer section entry corresponding to the example DNS message format of FIG. 7A.

In an embodiment, the network gateway device 204*a* generates a DNS response in accordance with the DNS message format 700 shown in FIG. 7A. In such an embodiment, the identification field 702 is populated with the same 16-bit identification field used in the DNS query; however, a "1" is placed in the first bit of the parameter field 704 to indicate that the message is a response rather than a query, and the IP address from the DNS cache is provided as part of a resource record in the answer section 716. FIG. 7D illustrates an example format 770 for a resource record in the answer section 716. As shown in FIG. 7D, each resource record 770 includes a resource domain name 772, which comprises the domain name obtained from the original DNS query, and a resource data field 782, which is used to provide the corresponding IP address. As the example DNS message format 700 allows multiple name and address mappings to be provided in a single DNS response, the "number of answers" field 708 is used to indicated the total number of resource records in the answer section 716.

In a further embodiment, the network gateway device 204*a* utilizes the recursion desired bit of the parameter field 704 of the DNS query in determining how to build the DNS response. For example, the following rules may be utilized:

(i) when all the information necessary to completely resolve the query is present in the DNS cache, a complete DNS response is built from the cached information, regardless of the value of the recursion desired bit. The time to live (TTL) value for each resource record in the DNS response is set to the time remaining from the TTL originally provided by the authoritative domain name server (see FIG. 7D);

(ii) when recursion is requested (recursion desired bit=1) and not all information is available in the DNS cache to completely resolve the domain name, no cached response will be given and the query will be forwarded to the IP network for resolution in accordance with standard domain name resolution protocols (e.g., the query will be forwarded to the primary domain name server assigned to the CPE for resolution);

(iii) when recursion is not requested (recursion desired bit=0) and not all information is available in the DNS cache to completely resolve the domain name, a DNS response will be built from the information available in the DNS cache. The TTL value for each resource record in the DNS response is set to the time remaining from the TTL originally provided by the authoritative domain name server (see FIG. 7D); and (iv) when no information for the given domain name is present in the DNS cache, no cached response will be given and the query will be forwarded to the IP network for resolution in accordance with standard domain name resolution protocols, regardless of the value of the recursion desired bit.

After the network gateway device 204*a* has generated a response to the DNS query, it transmits the response to the computer system 202*a* over the appropriate CPE interface (e.g., HPNA interface 508, Ethernet interface 510, or USB interface 512), as shown at step 612. The application running on the computer system 202*a* that generated the query may then extract the IP address from the response and use it to format packets for transmission via the network gateway device 204*a* to the IP network 206. Alternately, the application may provide the IP address to a higher level application for a similar purpose.

As shown at step 614, in the event that the network gateway device 204*a* cannot locate the unresolved domain name and associated IP address information in the DNS cache, it forwards the query to the cable modem system interface 516 for transmission to the IP network 206. The query will then be resolved in accordance with standard DNS resolution protocols. For example, the DNS query may be forwarded to the primary domain name server assigned to the computer system 202*a* for resolution in accordance with a recursive or iterative resolution protocol.

At step 616, the network gateway device 204*a* receives a response to the DNS query from the IP network 206 via the cable modem system interface 516. In accordance with embodiments of the present invention, the network gateway 204*a* continuously examines the protocol header field of IP datagrams received via the cable modem system interface 516 to identify DNS messages received from the IP network 206. If the protocol header field indicates that the IP datagram contains a DNS message, then the network gateway 204*a* will examine the DNS message to determine if it comprises a DNS response.

In an embodiment, the network gateway device 204*a* receives DNS messages from the IP network 206*a* formatted in accordance with the example DNS message format 700 illustrated in FIG. 7A. In such an embodiment, the network gateway device 204*a* determines whether the DNS message constitutes a DNS response by examining the parameter field 704. As shown in FIG. 7B, a "1" in the first bit of the parameter field 704 indicates that the DNS message is a DNS response.

At step 618, the network gateway device 204*a* examines the DNS response to determine if it resolves the query forwarded to the IP network 206 in step 614. Preferably, the network gateway device 204a also examines the DNS response to determine if it resolves any other DNS queries previously forwarded to the IP network 206 by the network gateway 204a. In an embodiment where the DNS message is formatted in accordance with the example format 700 of FIG. 7A, the network gateway device 204a performs this step by examining the answer section 716 to identify any domain name and IP address mappings that may resolve previously-transmitted DNS queries.

If the DNS response does not resolve a previously transmitted DNS query, then the network gateway device 204a immediately forwards the response to the computer system 202a over the appropriate CPE interface (e.g., HPNA interface 508, Ethernet interface 510, or USB interface 512), as shown at steps 618 and 620. However, if the DNS response does provide a domain name and IP address mapping that resolves a previously-transmitted DNS query, then the network gateway device 204a stores the resolved domain name and IP address from the response in the DNS cache before forwarding the response to the computer system 202a, as shown at steps 620 and 622. Note that it is also possible for a network-resolved query to return a pointer (e.g., a canonical name) to another domain name instead of an IP address. In an embodiment of the present invention, the network gateway device 204a stores these pointers along with the queried domain name in the DNS cache for use in resolving DNS queries generated by the attached CPE device.

As a result of the above-described method, the DNS cache on the network gateway 204a will be populated with those domain names and IP addresses that are most relevant to the computer system 202a and any other CPE devices attached to the network gateway device 204a. In embodiments where the size of the DNS cache is limited, the DNS cache may be maintained in accordance with an algorithm that ensures that only the most recently queried domain names and IP addresses remain in the cache. This may be achieved, for example, by assigning time stamps to each domain name entry in the DNS cache to indicate when a domain name was last queried by an attached CPE device. When the demand for cache space exceeds the size of the cache, the cache entry with the oldest time stamp may be deleted to accommodate a new entry.

In a further embodiment of the present invention, each entry in the cache is associated with a time-out value, and the network gateway device 204a removes entries from the cache when the time-out value is reached or exceeded. The time-out value is derived from the time to live (TTL) value that is provided for each domain name-IP address binding in the answer section of a DNS response, as illustrated in FIG. 7D. The TTL value typically contains an integer that specifies the number of seconds that the responding authority guarantees the binding to remain. By removing the timed-out entries, the network gateway device 204a eliminates potentially invalid bindings and increases cache space for storing newer bindings. Additionally, in accordance with this embodiment, when a CPE device queries a domain name that is located in the DNS cache that is close to timing out, the network gateway device 204a satisfies the request with information stored in the cache, but also forwards the request to the IP network 206 for resolution in accordance with standard DNS resolution protocols. The network gateway device 204a then uses the resulting DNS response from the IP network 206 to replace the expiring entry in the DNS cache.

It will be appreciated by persons skilled in the art that additional information may be stored in the DNS cache as desired for use by the network gateway device 204a and attached CPE devices. For example, many network domain name servers provide additional information beyond the IP address associated with a given domain name. Such information includes, but is not limited to, records from the authority section and additional information section of a DNS response, as illustrated in FIG. 7A. Authority records typically specify the domain name servers that are the authority for a given domain name. Additional information records typically contain resolution information for a domain name server described in the authority records section. This information may be stored in the DNS cache when available and provided to an attached CPE as part of the domain name resolution process.

D. Selective DNS Caching Based on CPE Information in Accordance with Embodiments of the Present Invention In accordance with further embodiments of the present invention, a network gateway, such as the network gateway 204 of FIG. 2, selectively populates an on-board DNS cache based on information provided by an attached CPE, such as the CPE 202 of FIG. 2. More specifically, the CPE executes an application program that generates a list of frequently accessed domain names. The list is then used to generate and transmit DNS queries over an IP network, such as IP network 206, to identify IP addresses for each of the domain names. Resolved domain names and corresponding IP addresses are then stored in the gateway DNS cache for use by application programs running on the attached CPE device.

Figure 8:
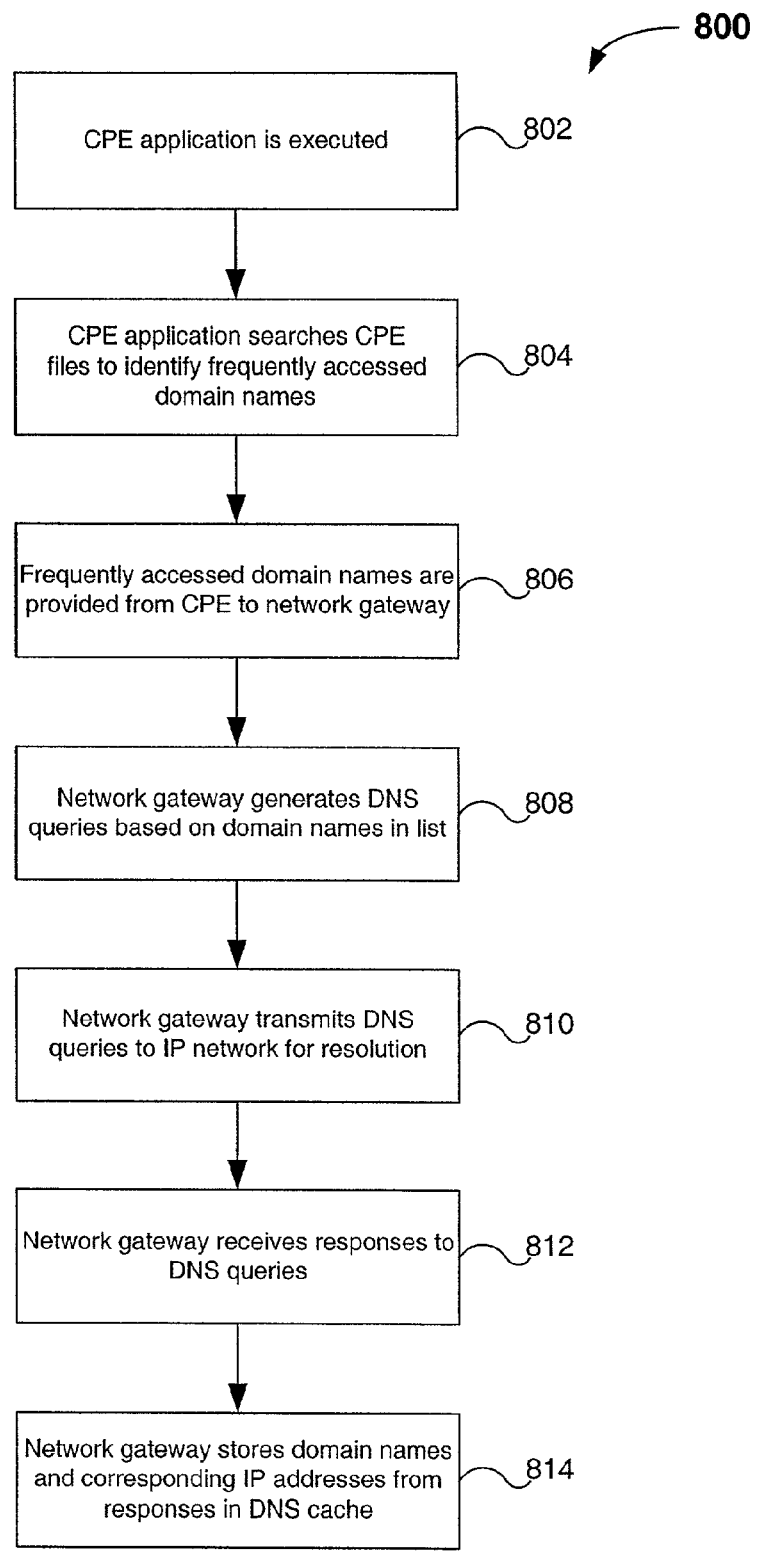
FIG. 8 depicts a flowchart of a method for selectively caching DNS information on a network gateway in accordance with embodiments of the present invention.

FIG. 8 depicts a flowchart 800 of a method for selectively caching DNS information on a network gateway in accordance with embodiments of the present invention. The invention, however, is not limited to the description provided by the flowchart 800. Rather, it will be apparent to persons skilled in the art from the teachings provided herein that other functional flows are within the scope and spirit of the present invention.

For convenience, the flowchart 800 will be described with continued reference to the example operating environment of FIG. 3, the example computer system 202a of FIG. 4 and the example network gateway device 204a of FIG. 5. For example, the method described in flowchart 800 may be performed, in whole or in part, under the control of the processor 444 of computer system 202a in accordance with program instructions stored in main memory 446 or secondary memory 448, and under the control of the CPU 518 of network gateway device 204a in accordance with program instructions stored in the non-volatile memory 504. However, the invention is not limited to those embodiments.

The method of flowchart 800 begins with the execution of a CPE search application by the computer system 202a. In an embodiment, the CPE search application is executed automatically as part of an operating system start-up routine that occurs whenever the computer system 202a is powered on. In an alternate embodiment, the CPE search application is automatically executed on a periodic basis by the operating system of computer system 202a while the operating system is active. In another alternate embodiment, the CPE search application is executed in accordance with selected user inputs to the computer system 202a. For example, the CPE search application may be executed each time the user launches an application that utilizes DNS information, such as, for example, a Web browser that generates IP packets for transmission to the network gateway device 204a. Preferably, the execution of the CPE search application is transparent to the user of the computer system 202a.

Once executed, the CPE search application searches one or more files on the computer system 202a to identify frequently accessed domain names, as shown at step 804. In an embodiment, the CPE application searches one or more files on the computer system 202a that are known to hold frequently used domain names. For example, the CPE application may search files associated with a Web browser, such as files that includes the domain names of favorite user Web sites, or with an electronic mail application, such as a file that identifies the domain name of one or more e-mail host data servers. Preferably, each of the files that is scanned has a commonly known or ascertainable format that is fixed over time.

At step 806, the frequently accessed domain names identified by the CPE search application are provided to the network gateway device 204a. In an embodiment, the CPE search application calls a software routine that packetizes the domain name information and transmits it to the network gateway device 204a over the communication interface 464. The packets carrying the domain name information may be formatted in accordance with a proprietary protocol type defined within the bounds of TCP/IP for identification and processing by the network gateway device 204a.

In an alternate embodiment, the domain name information is stored in memory within the computer system 202a, such as in a file stored in secondary memory 448, and is packetized and transmitted to the network gateway device 204a at a later time. For example, in an embodiment, the stored domain name information is provided to the network gateway device 204a when an appropriate request is received by the computer system 202a from the network gateway device 204a. In an embodiment, the request is formatted in accordance with a proprietary protocol type defined within the bounds of TCP/IP for identification and processing by the computer system 202a.

In a still further embodiment, the domain name information is provided to the network gateway device 204a as a Management Information Base (MIB) for storage on the network gateway device 204a using well-known network management protocols, such as Simple Network Management Protocol (SNMP) or Remote Monitoring (RMON) protocol. The MIB may be stored in the volatile memory 506 in the network gateway device 204a or within dedicated registers accessible by the gateway CPU 518 (not shown in FIG. 5). Alternately, the domain name information may be stored as a MIB on the computer system 202a and accessed by the network gateway device 204a using well-known network management protocols. In such an embodiment, the MIB may be stored, for example, within the secondary memory 448 or within dedicated registers within the computer system 202a (not shown in FIG. 4).

Upon receiving the domain name information from the computer system 202a, the network gateway device 204a generates one or more DNS queries to resolve the identified domain names, as shown at step 808. The DNS queries are preferably formatted as iterative, as opposed to recursive, resolution requests, so that prolonged network searching may be avoided. In an embodiment, these DNS queries are formatted in accordance with the example DNS message format 700 of FIG. 7A.

The network gateway 204a then provides the DNS queries to the cable modem system interface 516 for transmission to a domain name server on the IP network 206 for resolution in accordance with standard DNS protocols, as shown at step 810. The domain name server selected by the network gateway device 204a for resolution purposes may be identified by monitoring DNS messages received and/or sent by the computer system 202a to extract the address of a domain name server, or may be provisioned into the network gateway device 204a during network start-up by an external network entity such as the DHCP server 208 or the CMTS 308.

At step 812, the network gateway device 204a receives one or more responses to the DNS queries transmitted to the IP network in step 810. In an embodiment, the response is formatted in accordance with the example DNS message format 700 of FIG. 7. Where a domain name has been successfully resolved, the network gateway device 204a extracts the domain name and its corresponding IP address from the DNS response and stores them in the DNS cache for future use by applications on the computer system 202a, as shown at step 814. Where a domain name remains unresolved, the network gateway 204a does not enter the domain name in the DNS cache, or enters it in the DNS cache with a null entry for the corresponding IP address, such that a cache miss will result for subsequent DNS queries directed to the same domain name.

Figure 9:
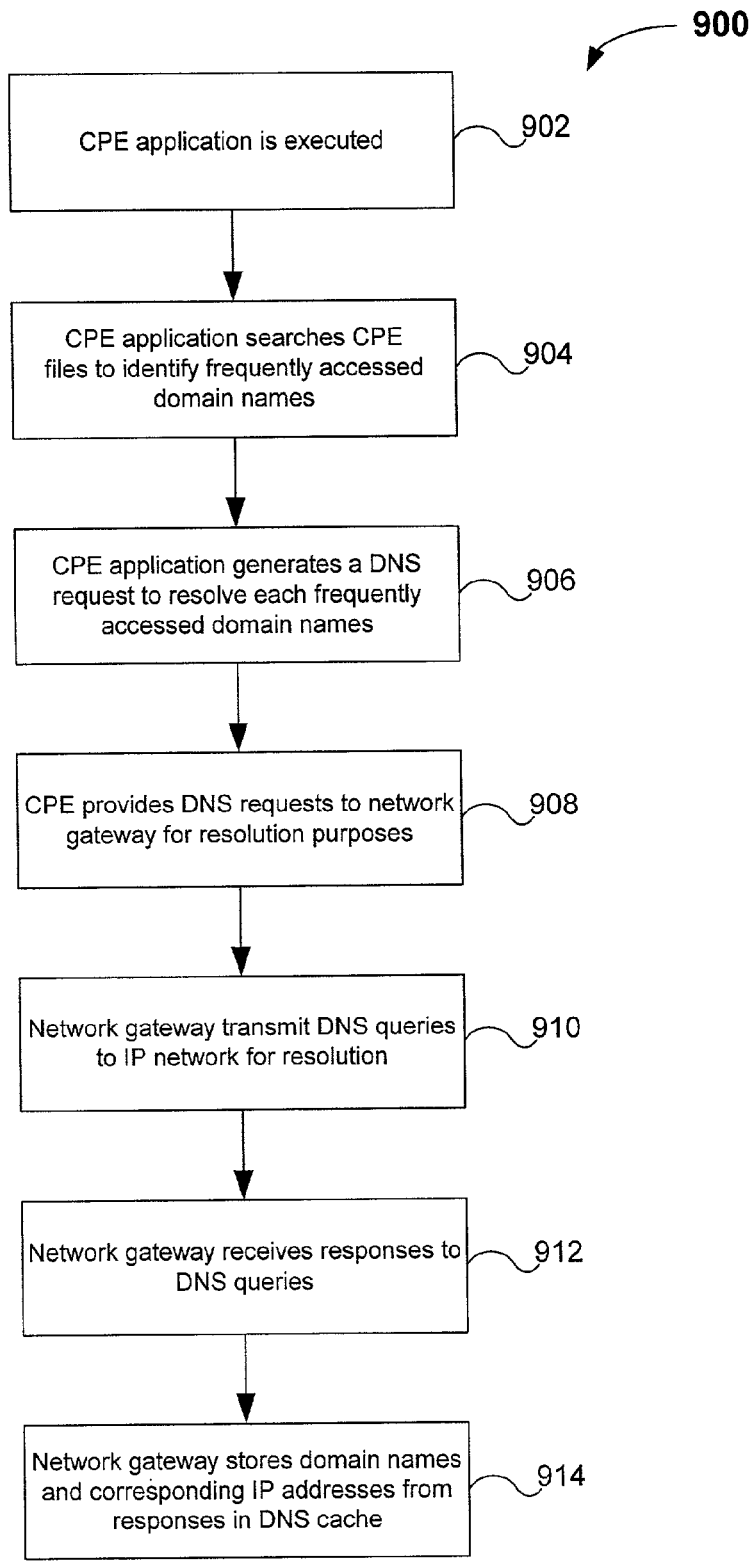
FIG. 9 depicts a flowchart of a method for selectively caching DNS information on a network gateway in accordance with embodiments of the present invention.

FIG. 9 depicts a flowchart 900 of an alternative method for selectively caching DNS information on a network gateway in accordance with embodiments of the present invention. The invention, however, is not limited to the description provided by the flowchart 900. Rather, it will be apparent to persons skilled in the art from the teachings provided herein that other functional flows are within the scope and spirit of the present invention.

The first two steps of the flowchart 900 are substantially the same as steps 802 and 804 of the method described in reference to the flowchart 800 of FIG. 8. Namely, at step 902, the CPE application is executed and at step 904, the CPE application searches one or more CPE files to identify frequently accessed domain names. These steps have been described in more detail above.

Once the frequently accessed domain names have been identified, the CPE application generates a DNS request for each frequently accessed domain name to resolve each domain name in accordance with standard DNS protocols, as shown at step 906. The CPE application may generate the DNS requests itself, or may call another application program resident on computer system 202a to generate the requests. At step 908, the CPE provides the DNS requests to the network gateway 204a for resolution purposes.

Upon receiving the DNS requests, the network gateway 204a forwards them to the cable modem system interface 516 for transmission to a domain name server on the IP network 206 for resolution in accordance with standard DNS protocols, as shown at step 910.

At step 912, the network gateway device 204a receives one or more responses to the DNS queries transmitted to the IP network in step 910. In an embodiment, the response is formatted in accordance with the example DNS message format 700 of FIG. 7 Where a domain name has been successfully resolved, the network gateway device 204a extracts the domain name and its corresponding IP address from the DNS response and stores them in the DNS cache for future use by applications on the computer system 202a, as shown at step 914. Where a domain name remains unresolved, the network gateway 204a does not enter the domain name in the DNS cache, or enters it in the DNS cache with a null entry for the corresponding IP address, such that a cache miss will result for subsequent DNS queries directed to the same domain name.

The methods described above in reference to flowcharts 800 and 900 advantageously permits a DNS cache on a network gateway to be selectively loaded with the domain names and IP addresses that are most frequently accessed by an attached CPE. Note that, in accordance with the method of flowchart 900, the normal DNS caching operations of the network gateway, as described in section C, are utilized to perform this selective loading of the DNS cache.

In embodiments, either of these methods may be utilized to pre-load the DNS cache before execution of other DNS caching techniques, such as the technique described above in reference to flowchart 600. In particular, either of the methods may be used in addition to, or in lieu of, the optional cache pre-loading step 602 described in reference to flowchart 600. In an embodiment where the method described in reference to flowchart 800 is executed subsequent to the cache pre-loading step 602, the network gateway device 204a may compare the frequently accessed domain names received from the computer system 202a (see step 806 of FIG. 8) to the domain names pre-loaded into the DNS cache in step 602, to determine if the generation of DNS queries is necessary. Where a domain name is already loaded into the DNS cache, a DNS query need not be generated.

E. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for caching domain name system information in a network gateway that includes a customer premises equipment interface, a network interface, and a cache for storing domain names and corresponding IP addresses, comprising:

loading the cache with a preliminary set of domain names and corresponding IP addresses;

receiving a domain name system query from a customer premises equipment over the customer premises equipment interface, said query including an unresolved domain name;

determining if said unresolved domain name is stored in the cache;

if said unresolved domain name is stored in the cache, obtaining an IP address corresponding to said unresolved domain name from the cache, generating a response to said query that includes said IP address corresponding to said unresolved domain name, and providing said response to the customer premises equipment interface for transmission to said customer premises equipment; and if said unresolved domain name is not stored in said cache, providing said query to the network interface for transmission to a network for resolution of said query;

wherein the preliminary set of domain names and corresponding IP addresses represent a selected set of addresses in an IP network to which the customer premises equipment is entitled to have access based on restrictions made by a network entity.

2. The method of claim 1, further comprising:

receiving a domain name system response from said network over the network interface, said response including a response domain name and an IP address corresponding to said response domain name;

storing said response domain name and said IP address corresponding to said response domain name in the cache; and providing said response to the customer premises equipment interface for transmission to said customer premises equipment.

3. The method of claim 1, wherein said loading is initiated by an entity on said network.

4. The method of claim 1, wherein said loading is initiated by said customer premises equipment.

5. The method of claim 1, further comprising:

continuously monitoring packets received by the customer premises equipment interface from said customer premises equipment to identify domain name system queries.

6. The method of claim 5, wherein said continuous monitoring comprises examining a protocol header field of said packets received by the customer premises equipment interface from said customer premises equipment to identify domain name system messages.

7. The method of claim 6, wherein said continuous monitoring further comprises examining a parameter field of said domain name system messages received by the customer premises equipment interface from said customer premises equipment to identify domain name system queries.

8. The method of claim 2, further comprising:

continuously monitoring packets received by the network interface from said network to identify domain name system responses.

9. The method of claim 8, wherein said continuous monitoring comprises examining a protocol header field of said packets received by the network interface from said network to identify domain name system messages.

10. The method of claim 9, wherein said continuous monitoring further comprises examining a parameter field of said domain name system messages received by the network interface from said network to identify domain name system responses.

11. A method for caching domain name system information in a network gateway that includes a customer premises equipment interface, a network interface, and a cache for storing domain names and corresponding IP addresses, comprising:

loading the cache with a preliminary set of domain names and corresponding IP addresses;

receiving a domain name system response from a network over the network interface, said response including a response domain name and an IP address corresponding to said response domain name;

storing said response domain name and said IP address corresponding to said response domain name in the cache; and providing said response to the customer premises equipment interface for transmission to a customer premises equipment;

wherein the preliminary set of domain names and corresponding IP addresses represent a selected set of addresses in an IP network to which the customer premises equipment is entitled to have access based on restrictions made by a network entity.

12. The method of claim 11, further comprising:

continuously monitoring packets received by the network interface from said network to identify domain name system responses.

13. The method of claim 12, wherein said continuous monitoring comprises examining a protocol header field of said packets received by the network interface from said network to identify domain name system messages.

14. The method of claim 13, wherein said continuous monitoring further comprises examining a parameter field of said domain name system messages received by the network interface from said network to identify domain name system responses.

15. A method for caching domain name system information in a network gateway that includes a customer premises equipment interface, a network interface, and a cache for storing domain names and corresponding IP addresses, comprising:
loading the cache with a preliminary set of domain names and corresponding IP addresses
receiving a domain name system response from a network over the network interface;
determining if said response includes a response domain name and an IP address corresponding to said response domain name;
if said response includes a response domain name and an IP address corresponding to said response domain name, storing said response domain name and said IP address corresponding to said response domain name in the cache, and providing said response to the customer premises equipment interface for transmission to a customer premises equipment; and
if said response does not include a response domain name and an IP address corresponding to said response domain name, providing said response to the customer premises equipment interface for transmission to said customer premises equipment without storing any information in the cache;
wherein the preliminary set of domain names and corresponding IP addresses represent a selected set of addresses in an IP network to which the customer premises equipment is entitled to have access based on restrictions made by a network entity.

16. A network gateway, comprising:
a memory, said memory comprising a cache that stores domain names and corresponding IP addresses, wherein said cache is loaded with a preliminary set of domain names and corresponding IP addresses;
a customer premises equipment interface that receives a domain name system query from a customer premises equipment, said query including an unresolved domain name;
a network interface that communicates with a network; and
a processor coupled to said memory, said customer premises equipment interface, and said network interface, said processor configured to receive said domain name system query from said customer premises equipment and to determine if said unresolved domain name is stored in said cache;
wherein said processor is further configured to obtain an IP address corresponding to said unresolved domain name from said cache, generate a response to said query that includes said IP address corresponding to said unresolved domain name, and provide said response to said customer premises equipment interface for transmission to said customer premises equipment, if said unresolved domain name is stored in said cache;
wherein said processor is further configured to provide said query to said network interface for transmission to a network for resolution of said query if said unresolved domain name is not stored in said cache; and
wherein the preliminary set of domain names and corresponding IP addresses represent a selected set of addresses in an IP network to which the customer premises equipment is entitled to have access based on restrictions made by a network entity.

17. The network gateway of claim 16 wherein:
said network interface is adapted to receive a domain name system response from said network, said response including a response domain name and an IP address corresponding to said response domain name; and
wherein said processor is further configured to store said response domain name and said IP address corresponding to said response domain name in said cache and provide said response to said customer premises equipment interface for transmission to said customer premises equipment.

18. The network gateway of claim 16, wherein said customer premises equipment interface is a home phoneline network interface, an Ethernet interface, or a Universal Serial Bus interface.

19. The network gateway of claim 16, wherein said network interface comprises a cable modem system interface.

20. The network gateway of claim 16, wherein said memory comprises an SDRAM.

21. The network gateway of claim 16, wherein said processor is further configured to continuously monitor packets received by said customer premises equipment interface from said customer premises equipment to identify domain name system queries.

22. The network gateway of claim 17, wherein said processor is further configured to continuously monitor packets received by said network interface from said network to identify domain name system responses.

23. A network gateway, comprising:
a memory, said memory comprising a cache that stores domain names and corresponding IP addresses, wherein said cache is loaded with a preliminary set of domain names and corresponding IP addresses;
a customer premises equipment interface that communicates with a customer premises equipment;
a network interface that receives a domain name system response from a network, said response including a response domain name and an IP address corresponding to said response domain name; and
a processor coupled to said memory, said customer premises equipment interface, and said network interface, said processor configured to store said response domain name and said IP address corresponding to said response domain name in said cache and provide said response to the customer premises equipment interface for transmission to a customer premises equipment;
wherein the preliminary set of domain names and corresponding IP addresses represent a selected set of addresses in an IP network to which the customer premises equipment is entitled to have access based on restrictions made by a network entity.

24. The network gateway of claim 23, wherein said processor is further configured to continuously monitor packets received by said network interface from said network to identify domain name system responses.

25. A network gateway, comprising:
a memory, said memory comprising a cache that stores domain names and corresponding IP addresses, wherein said cache is loaded with a preliminary set of domain names and corresponding IP addresses;

a customer premises equipment interface that communicates with a customer premises equipment;

a network interface that receives a domain name system response from a network; and a processor coupled to said memory, said customer premises equipment interface, and said network interface, said processor configured to receive said response from said network interface and determine if said response includes a response domain name and an IP address corresponding to said response domain name;

wherein said processor is further configured such that, if said response includes a response domain name and an IP address corresponding to said response domain name, said processor stores said response domain name and said IP address corresponding to said response domain name in said cache and provides said response to said customer premises equipment interface for transmission to said customer premises equipment;

wherein said processor is further configured such that, if said response does not include a response domain name and an W address corresponding to said response domain name, said processor provides said response to said customer premises equipment interface for transmission to said customer premises equipment without storing any information in said cache; and wherein the preliminary set of domain names and corresponding IP addresses represent a selected set of addresses in an IP network to which the customer premises equipment is entitled to have access based on restrictions made by a network entity.

26. A computer program product comprising a computer useable storage medium having computer program logic for enabling a processor in a network gateway to perform caching of domain name system information, said network gateway further including a customer premises equipment interface, a network interface, and a cache for storing domain names and corresponding IP addresses, comprising:

means for enabling the processor to load the cache with a preliminary set of domain names and corresponding IP addresses, the preliminary set of domain names and corresponding IP addresses representing a selected set of addresses in an IP network to which the customer premises equipment interface is entitled to have access based on restrictions made by a network entity;

means for enabling the processor to receive a domain name system query from said customer premises equipment interface, said query including an unresolved domain name;

means for enabling the processor to determine if said unresolved domain name is stored in the cache;

means for enabling the processor to obtain an IP address corresponding to said unresolved domain name from the cache, generate a response to said query that includes said IP address corresponding to said unresolved domain name, and provide said response to the customer premises equipment interface, if said unresolved domain name is stored in the cache; and means for enabling the processor to provide said query to the network interface if said unresolved domain name is not stored in the cache.

27. The computer program product of claim 26, further comprising:

means for enabling the processor to receive a domain name system response from the network interface, said response including a response domain name and an IP address corresponding to said response domain name;

means for enabling the processor to store said response domain name and said IP address corresponding to said response domain name in the cache; and means for enabling the processor to provide said response to the customer premises equipment interface.

28. The computer program product of claim 26, further comprising:

means for enabling the processor to continuously monitor packets received from the customer premises equipment interface to identify domain name system queries.

29. The computer program product of claim 27, further comprising:

means for enabling the processor to continuously monitor packets received from the network interface to identify domain name system responses.

30. A computer program product comprising a computer useable medium having computer program logic for enabling a processor in a network gateway to perform caching of domain name system information, the network gateway further including a customer premises equipment interface, a network interface, and a cache for storing domain names and corresponding IP addresses, comprising:

means for enabling the processor to load the cache with a preliminary set of domain names and corresponding IP addresses, the preliminary set of domain names and corresponding IP addresses representing a selected set of addresses in an IP network to which the customer premises equipment interface is entitled to have access based on restrictions made by a network entity;

means for enabling the processor to receive a domain name system response from the network interface, said response including a response domain name and an IP address corresponding to said response domain name;

means for enabling the processor to store said response domain name and said IP address corresponding to said response domain name in the cache; and means for enabling the processor to provide said response to the customer premises equipment interface.

31. The computer program product of claim 30, further comprising:

means for enabling the processor to continuously monitor packets received from the network interface to identify domain name system responses.

* * * * *

UNITED STATES PATENT AND TRADEMARK OFFICE
CERTIFICATE OF CORRECTION

PATENT NO. : 7,152,118 B2  Page 1 of 1
APPLICATION NO. : 10/080676
DATED : December 19, 2006
INVENTOR(S) : Anderson, IV et al.

It is certified that error appears in the above-identified patent and that said Letters Patent is hereby corrected as shown below:

Column 7, line 56 please replace "storape" with --storage--.
Column 19, line 16 please replace "addresses" with --addresses;--.

Signed and Sealed this

Eighteenth Day of December, 2007

JON W. DUDAS
*Director of the United States Patent and Trademark Office*